March 10, 1970 J. S. DAVIS ET AL 3,500,352

NON-DESTRUCTIVE READOUT ARRANGEMENTS FOR A WOVEN SCREEN MEMORY

Filed July 23, 1965 2 Sheets-Sheet 1

INVENTORS
JOHN S. DAVIS
PAUL E. WELLS
BY Fraser and Bogucki
ATTORNEYS

March 10, 1970 J. S. DAVIS ET AL 3,500,352

NON-DESTRUCTIVE READOUT ARRANGEMENTS FOR A WOVEN SCREEN MEMORY

Filed July 23, 1965 2 Sheets-Sheet 2

INVENTORS
JOHN S. DAVIS
PAUL E. WELLS
BY Fraser and Bogucki
ATTORNEYS

United States Patent Office 3,500,352

Patented Mar. 10, 1970

3,500,352

NON-DESTRUCTIVE READOUT ARRANGEMENTS FOR A WOVEN SCREEN MEMORY

John S. Davis, Glendale, and Paul E. Wells, Los Angeles, Calif., assignors to The Bunker-Ramo Corporation, Stamford, Conn., a corporation of Delaware Continuation-in-part of application Ser. No. 380,982, June 29, 1964. This application July 23, 1965, Ser. No. 474,348

Int. Cl. G11b *5/00*

U.S. Cl. 340—174 14 Claims

ABSTRACT OF THE DISCLOSURE

Non-destructive readout memory apparatus utilizing grain-oriented remanently magnetic material as a storage medium in various configurations which include a particularly oriented conductor which may be driven to disturb the stored magnetization state without destroying same.

This invention relates to information storage devices, and more particularly to such devices of the woven screen memory type which provide non-destructive readout capability. This application is a continuation-in-part of applicants' prior co-pending application Serial No. 380,-982, filed June 29, 1964, now Patent 3,300,767, which was a continuation of application Serial No. 53,008, filed August 30, 1960, now abandoned.

The woven screen memory is a relatively recent and important development in the field of magnetic memory devices for information storage. Both ferrite cores and magnetic thin film memory devices have long been known as information storage media. However, certain disadvantages inherent in each of these respective types of devices have precluded their universal acceptance as an ideal information storage device. Toroidal ferrite cores provide desirable operating characteristics for information storage, but the problem of fabricating substantial pluralities of such cores to form a unified matrix renders the cost of such a matrix comparatively high. Magnetic thin film devices, on the other hand, may be fabricated by mass production techniques, but they lack the desirable magnetic properties which render the ferrite cores superior as storage elements.

The woven screen memory successfully combines the advantages of both of the storage devices described above. It provides a plurality of magnetic storage cells having operating characteristics comparable to the ferrite core in a memory plane which may be fabricated by mass production techniques. Basically, the woven screen memory comprises a plane of interwoven orthogonal substrate filaments (usually wires) with a layer of remanently magnetic material deposited thereon, and a plurality of insulated control wires threading the screen meshes which define the individual storage cells. In a typical case, a memory plane may be fabricated by depositing magnetic material on a suitably treated wire screen and thereafter threading the individual storage cells with the respective control conductors, or it may be produced by interweaving both bare metallic and insulated wires in an orthogonal array and thereafter selectively depositing magnetic material on the metallic grid substrate. In either event, a single magnetic cell may be formed by the intersection of pairs of orthogonal metallic wires. The control conductors thread these square metallic cells in the proper direction so that information may be stored and read out under the influence of suitable control currents down the insulated wires.

Various memory structures have been disclosed which make use of the woven screen fabrication techniques. In the main, however, such structural arrangements have been operable on a destructive readout basis; that is, these devices have been useful for the storage of information in the form of particular condition-representing magnetization states which are either destroyed or restored to a particular binary zero-representing condition during the readout step in determining the particular bit of information which has been stored. Such memory arrangements necessitate restorage of the information each time it is read out if it is to be maintained in the memory.

Accordingly, therefore, it is a general object of the present invention to provide an improved woven screen memory device.

It is a further object of the present invention to provide a woven screen memory device having the capability of non-destructive readout.

It is a more specific object of the present invention to provide woven screen memory devices in which stored information may be read out in a different operating mode from that which is used to store information therein.

Another object of the present invention is to provide a matrix of information storage devices having the capability of non-destructive readout, which devices may be readily fabricated by automatic weaving and deposition techniques.

In brief, arrangements in accordance with the present invention relate to woven screen memory devices having the capability of non-destructive readout or interrogation of stored information. (It may be here noted that throughout the following, the terms "non-destructive readout" and "interrogation" will be used synonymously.) These arrangements make use of the magnetic anisotropy of the magnetic layer deposited on the substrate of the individual cells. During the deposition of this magnetic layer, the crystals of the material are grain oriented with an easy direction of magnetization extending in a particular direction in the cell configuration. Non-destructive readout of the existing magnetization state of a selected device is accomplished by disturbing the flux pattern of the particular device without reversing the magnetization state; that is, without permanently changing the condition-representing state of the device.

Some arrangements in accordance with the present invention provide a woven screen structure which comprises an insulated "interrogate" conductor as at least a part of the substrate loop on which magnetic material is deposited. Remanent magnetization conditions corresponding to particular information to be stored may be selectively established in the storage cells of such arrangements in the usual fashion, for example by applying storage or write currents on orthogonal conductors threading the particular cell or cells selected for the storage of information. A non-destructive readout of stored information may then be performed by applying a current to the interrogate conductor threading the substrate portion of the cell loop. Current along such a conductor develops a time-varying rotational magnetic field substantially at right angles to the field which is established to write information into the cell. As a result, the magnetization state of that portion of the cell is rotated and without being reversed in direction. It does, however, cause a change in the flux pattern around the cell loop and this change is detected as a voltage pulse induced on a sense conductor which also threads the cell. Upon termination of the readout pulse, any pre-existing remanent magnetization state is restored by virtue of the magnetic anisotropy of the device.

One particular arrangement in accordance with the invention as generally described above may comprise a plurality of substrate and control wires interwoven to define a matrix which has remanently magnetic material selectively deposited on the substrate wires. Selected ones of the substrate wires are insulated. Each individual storage cell may comprise a substantially square loop or mesh of remanently magnetic material with a pair of orthogonal control conductors threaded therethrough and a readout, or interrogate, conductor extending inside the magnetic material along one side of the loop. Binary coded information may be stored in a selected cell by applying coincident currents of suitable magnitude and direction to the control conductors threading the cell so as to establish either a clockwise or counter-clockwise direction of remanent magnetization about the cell. Readout of the stored magnetization state is accomplished without reversing the remanent magnetic flux pattern by applying a current along the interrogate conductor which threads one leg of the magnetic loop. During readout one of control conductors threading the loop is utilized as a sense conductor and the waveform of an induced pulse on the sense conductor indicates the stored magnetization state.

A second particular arrangement in accordance with the invention is similar to the one described immediately above except that the storage cell is formed of two square adjacent meshes having a common center rail. The center rail of the cell comprises a leg with insulated wire along which current may be passed to interrogate the stored magnetization state. Both adjacent meshes of the individual storage cell are threaded by the selective write conductors. Binary coded information is stored by establishing a given magnetization state in one or the other of the two meshes comprising the cell. One advantage of such an arrangement is the fact that the flux in the center leg is completely switched during the storage process. The information is then non-destructively read out by passing current along the center rail of the cell to provide a momentary disturbance of the established flux state which results in an output signal on the sense lead threading both meshes of the cell which is indicative of the stored information state.

A third particular arrangement in accordance with the invention may be formed by weaving an insulated interrogate conductor in a loop weave so that it encompasses successive intersections of one set of control conductors with an orthogonal control conductor along which it extends. A particular advantage in this arrangement is the facility with which the magnetic surface area or volume of the cell may be controlled; for example, if additional magnetic surface area or additional drive to the cells is desired, multiple loops at any given cell may be readily provided.

Another particular arrangement in accordance with the invention provides a non-destructive readout storage cell by developing one leg of the cell to have a higher coercive force than the remainings legs. The higher coercive force leg stores a larger magnetomotive force during the write cycle and this larger magnetomotive force is effective in resetting the cell after interrogation. The cell is interrogated by applying current pulses of reduced amplitude along the same conductors which are used to write information into the cell. Additional sense leads are also provided to transmit the induced pulses which are indicative of the stored information state. The interrogate pulses of reduced amplitude which are applied to the control conductors to read out the stored information state are not sufficient to reverse the remanent magnetization state of the entire magnetic loop of the cell, even though they may be sufficient to switch one or more of the individual legs. After these interrogate pulses are terminated, the magnetomotive force of the higher coercive force leg restores the magnetization state of the remaining legs of the cell to that which was established by the information storage pulses. The variable coercive force present in different portions of such a cell can be developed by using different substrate materials in the different legs, by striating the substrate wires selectively prior to weaving in order to control the direction in which the crystals become oriented during the deposition process, or by varying the configuration of the cell itself, as by establishing a different cross-sectional area or volume of the magnetic material in a selected portion of the cell. If desired, a special high coercive force material may be formed on a particular substrate wire prior to weaving so that this wire forms the higher coercive force leg of the resulting cells. Particular storage cell arrangements in accordance with this aspect of the invention are not limited to the provision of a higher coercive force material in only one leg of the storage cell. It is possible, by applying the same techniques to different portions of a cell, to develop a cell having multiple legs which present a high coercive force with the remaining legs having a lower coercive force, if desired.

In still another particular arrangement in accordance with the invention, there is provided what may be considered a woven screen equivalent of a ferrite core having multiple orthogonal apertures. One such ferrite core device achieves non-destructive readout by virtue of having dual apertures arranged in orthogonal directions, somewhat in the manner of a twisted figure "8." In this particular arrangement in accordance with the invention, the storage cell comprises a pair of insulated conductors interwoven at substantially right angles with remanently magnetic material encompassing the two conductors at their intersection. The resulting storage cell has a somewhat spherical configuration in which stored magnetic flux exists in closed loops aligned with a plane of easy magnetization which is diagonal to the insulated conductors encompassed by the cell. The two binary information states may be represented by the two distinct diagonal planes of plus and minus 45° respectively, relative to an individual control conductor associated with the cell. Information may be stored by establishing a particular remanent magnetization state on a coincident current basis by applying appropriate half-select currents to the two conductors of a given cell. The stored information is then read out non-destructively on a word-organized basis by applying current along one of the conductors of a cell and sensing the polarity of the readout signal induced on the other orthogonal conductor, which during the readout step functions as a sense lead. The interrogate current causes partial rotation of the stored magnetic flux vector to develop the readout signal. The interrogate current is maintained at a level which is appropriate to operate the remanently magnetic material in the reversible or so-called "elastic" region so that the flux pattern returns to the originally established magnetization state upon the termination of the readout current.

A better understanding of the present invention may be had from a consideration of the following detailed description, taken in conjunction with the accompanying drawings, in which.

Figure 1:
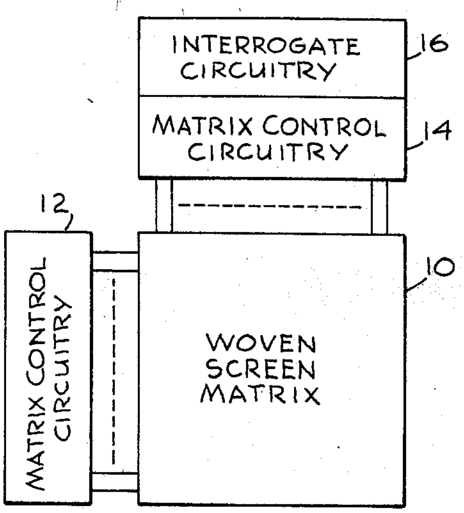
FIGURE 1 is a diagram of a general arrangement of control and readout circuitry associated with a woven screen matrix.

In FIG. 1, a woven screen matrix 10, which it will be understood may comprise a plurality of any of the particular configurations of storage cells in accordance with the present invention as described herein, is shown connected to conventional control circuitry 12 and 14, in order to achieve the storage and retrieval of binary coded information. Matrix control circuitry 12 is coupled to the horizontal drive leads threading the woven screen matrix 10 while matrix control circuitry 14 is coupled to the vertical drive leads of the woven screen matrix 10 for operation in the conventional coincident current mode. Interrogate circuitry 16 is connected to particular conductors of the woven screen matrix 10 through the vertical matrix control circuitry 14 in order to receive readout pulses indicative of stored information when the woven screen matrix 10 is interrogated by the application of currents on selected horizontal drive leads connected to the matrix control circuitry 12. In some of the particular storage cell configurations to be described, the vertical drive leads function as the sense leads as well, whereas in others of the particular configurations in accordance with the present invention separate sense conductors are provided.

Figure 2:
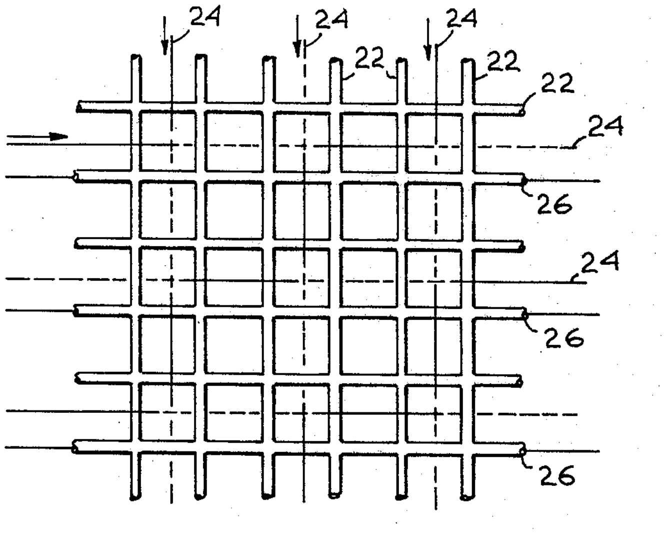
FIG. 2 is a representation of a portion of one particular woven screen memory arrangement in accordance with the invention which may be utilized in the matrix of FIG. 1.

FIG. 2 represents a particular storage cell configuration for non-destructive readout of stored information in accordance with the present invention which may be considered to be a portion of the woven screen matrix 10 of FIG. 1. In this configuration, a plurality of substrate wires 22 and control conductors 24 are interwoven to form a matrix. The substrate wires 22 are covered with a coating of remanently magnetic material in order to form closed loops of magnetic material about the individual cells of the interwoven substrate wires 22 through which the control conductors 24 are threaded. It will be noted that particular conductors 26 are included as part of the substrate together with the wires 22. The conductors 26 are insulated wires and serve not only as part of the substrate on which the remanently magnetic material is deposited, but also provide for the non-destructive readout of stored information from the individual storage cells when interrogate current is selectively applied to the conductors 26. Each intersection of a pair of control conductors 24, together with its surrounding substrate wires 22 and 26 and the remanent magnetic material deposited thereon, constitutes an individual storage cell. There are nine such storage cells depicted in FIG. 2 together with rows of buffer cells extending between adjacent pairs of storage cells. If each individual storage cell in FIG. 2 is considered to comprise four legs arranged in a single mesh or closed loop through which the control conductors 24 are threaded, then it will be seen that the bottom leg of each individual storage cell comprises a conductor 26.

In considering the operation of the particular arrangement depicted in FIG. 2, let it be assumed that each of the individual storage cells is in the binary zero state, that is, driven to saturation at one end of the hysteresis loop, as may be achieved by the application of full drive currents along the horizontal control conductors 24 in a direction from right to left. Particular binary coded information may then be stored by applying appropriate levels of drive currents to selected sets of horizontal and vertical control conductors 24. In the example shown, half-select currents flowing in the pattern indicated by the arrows will serve to establish clockwise magnetic flux patterns about the individual storage cells at the right-hand and left-hand ends of the uppermost horizontal row. These may be considered to correspond to the storage of a binary one state in these positions. In the center storage cell of the uppermost horizontal row, however, the individual magnetic fields resulting from current flow in the directions indicated leave the magnetic flux pattern as previously established in the binary zero state, namely in a clockwise direction about the closed magnetic loop. (It should be noted that for the storage of a particular binary digit, the direction of magnetic flux reverses from one storage cell to the next in the particular weave pattern shown in FIG. 2. This is typical of woven screen memory matrices and actually results in an advantage insofar as compensation for random flux interference between adjacent storage cells is concerned.) Accordingly, for the current directions indicated, the uppermost horizontal row of the arrangement shown in FIG. 2 will store the binary digits 101.

Figure 10:
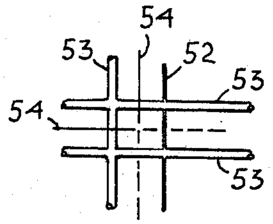
FIG. 10 represents yet another storage cell configuration in accordance with the invention which may be employed in the woven screen matrix of FIG. 1.

In order to interrogate, or read out, the stored information without destroying the established magnetization states, current may be applied to the uppermost conductor 26 which forms one of the legs of each of the storage cells of the uppermost horizontal row and thus threads the cylinder of remanently magnetic material which forms the corresponding portion of the magnetic loop of the cell. Current along this conductor 26 develops a circumferential magnetic field in the magnetic material of the correponding legs which is roughly orthogonal to the remanently magnetization flux representing the stored information. Thus the remanent flux is not destroyed by the interrogate pulse along the conductor 26; however, it is disturbed by a time-varying fluctuation in the effective reluctance of the closed magnetic loop of the individual storage cells so that the flux linking the control conductors 24 changes momentarily. The result is an induced signal on the corresponding conductors 24 having a waveform which is indicative of the binary digit stored in each individual cell. The vertical control conductors 24 are also utilized as sense conductors in the depicted arrangement and serve to transmit the particular indications of the stored binary digits to the readout circuitry 16 (FIG. 10). As soon as the interrogate pulse on the conductor 26 is terminated, the remanent magnetization state which was previously established is restored; thus the stored information is read out non-destructively, and may be read out repeatedly by subsequent interrogate pulses applied to the corresponding conductor 26.

Figure 3:
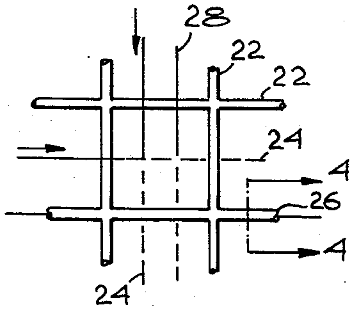
FIG. 3 is a representation of another particular storage arrangement in accordance with the invention which may be employed in the woven screen matrix of FIG. 1.

FIG. 3 depicts a single storage cell configuration in accordance with the invention which is similar to the individual storage cells shown in FIG. 2 with the exception that a separate sense conductor is provided. Thus FIG. 3 depicts a storage cell comprising individual substrate conductors 22, control conductors 24, and a readout conductor 26 which is also part of the substrate on which remanently magnetic material is deposited as in FIG. 2. In addition, however, an additional conductor 28 is shown threading the storage cell vertically to be coupled to the interrogate circuitry 16 of FIG. 1 in order to serve as an independent sensing means without the need for reliance on the vertical control conductor 24 for this purpose. Storage of information is accomplished in a manner identical to that described for the arrangement of FIG. 2. Similarly, non-destructive readout is achieved by the application of an interrogate pulse to the conductor 26. Since the sense conductor 28 threads the storage cell in the same manner as the vertical control conductor 24, a signal will be induced on the sense conductor 28 having a waveform indicative of the stored information state, just as was induced on the vertical control conductor 24 of FIG. 2.

Figure 4A:
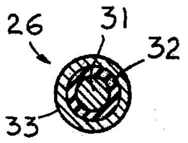
FIG. 4A is a sectional view taken along the lines 4—4 of FIG. 3 and represents one particular structural configuration which may be employed in the arrangement of FIG. 3.
Figure 4B:
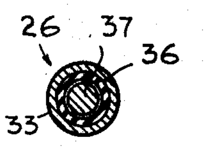
FIG. 4B is a sectional view of an alternative structural configuration which may be employed in place of the particular structure depicted in FIG. 4A.
Figure 4C:
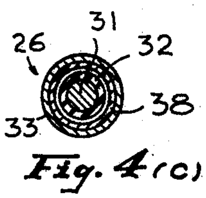
FIG. 4C is a sectional view of another alternative structural configuration which may be employed in the device of FIG. 3.

FIGS. 4A, 4B and 4C represent respective sectional views taken along the section line 4—4 of FIG. 3 and show alternative structural configurations which may be employed. In FIG. 4A, a conductor 26 is represented as comprising a conducting core 31, typically of copper or silver or some other good electrical conductor, surrounded by a layer of insulating material 32, typically Teflon or polyethylene. The insulation layer 32 may be treated appropriately, as with a flash coating of silver, gold or rhodium, for example, in order to form a surface on which an outer layer 33 of remanently magnetic material may be readily deposited.

In the alternative configuration depicted in FIG. 4B, a suitable hollow tube 36 of an insulating material, such as Teflon, is threaded with a bare conductor 37, preferably of copper. The insulating material 36 is treated in the same manner described in connection with FIG. 4A in order that a remanently magnetic layer 33 may be deposited thereon.

FIG. 4C illustrates a further alternative arrangement in the section 4—4 of FIG. 3 wherein a metallic tube 38 (preferably of copper) is threaded with an insulated conductor 31 and coated with a layer of remanently magnetic material 33. A layer of insulation 32 about the conductor 31 effectively insulates the conductor 31 from the metallic tube 38. Other arrangements may be devised to operate in equivalent manner to the described configurations.

Although particularly described with reference to the arrangement of FIG. 3, any one of the alternative structural configurations of FIGS. 4A, 4B and 4C may be employed as the interrogate conductors of the various arrangements in accordance with the invention described herein.

Figure 5:
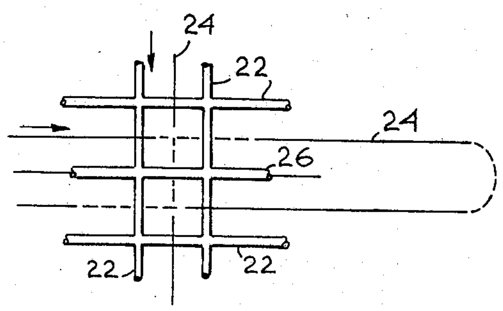
FIG. 5 is a diagram of a multi-apertured storage cell configuration in accordance with the invention which may be employed in the woven screen matrix of FIG. 1.

FIG. 5 depicts a particular storage cell configuration which is similar to the individual storage cells shown in FIG. 2 except that the storage cell of FIG. 5 is formed of two square adjacent cells. The result is a double apertured cell comprising substrate conductors 22, horizontal and vertical control conductors 24 and a readout conductor 26 on which remanently magnetic material is also deposited in addition to being deposited on the substrate conductors 22. The horizontal control conductor 24 is looped back on itself in order to thread both apertures of the storage cell. The interrogate conductor 26 comprises the center leg or rail of the cell. A first binary digit may be stored by applying currents in the direction indicated by the arrows. A principal advantage of the depicted dual aperture storage cell arrangement is the ability to completely switch the direction of remanent magnetic flux in the center leg during information storage. Non-destructive readout is achieved by the application of an interrogate pulse to the center leg conductor 26 which causes a disturbance of the remanent magnetic flux pattern without a reversal thereof, thus inducing a signal indicative of the stored information state on the vertical control conductor 24 which may be sensed by appropriate readout circuitry.

Figure 6:
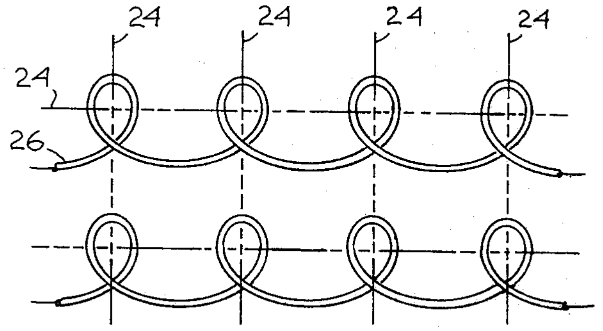
FIG. 6 is a diagram of another particular arrangement of storage cells in accordance with the invention which may be employed in the woven screen matrix of FIG. 1.

FIG. 6 depicts a particular loop arrangement of non-destructive readout storage cells in accordance with the invention in which an interrogate conductor 26 is looped about successive intersections of control conductors 24 in a particular row. These are no separate substrate wires 22, the interrogate conductor 26 serving as the entire substrate on which remanently magnetic material is deposited in the manner already described, in addition to being the interrogate conductor. This particular configuration is an attractive weave from a magnetic viewpoint, since there is only a single discontinuity in the magnetic loop at the point where the loop crosses itself to continue to the next cell. Storage and retrieval of information are accomplished in a manner similar to that described above, namely with coincident current drive pulses applied to the control conductor 24 to store individual bits of binary coded information in corresponding storage cells and with non-destructive readout being achieved by the application of interrogate pulses to the conductor 26. An interrogate pulse on the conductor 26 causes a momentary disturbance without reversal of the stored magnetization state in the individual cells and a resulting induced signal on the vertical control conductors 24 having a waveform corresponding to the particular binary digit stored in the respective cells. As before, the interrogate pulse along the conductor 26 develops a circumferential magnetic field substantially orthogonal to the flux pattern established by the writing of information into the cell so that the established flux pattern varies with time, but is not reversed by the interrogate pulse.

Figure 7:
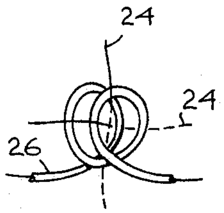
FIG. 7 represents a variation of the storage cell configuration depicted in FIG. 6.

FIG. 7 depicts a variation of the cell configuration of FIG. 6 wherein the interrogate conductor, serving also as the substrate on which remanently magnetic material is deposited to form a closed loop for the cell, is looped more than once at an individual cell. Operation of this storage cell is identical to the mode of operation described for the arrangement of FIG. 6. The advantage of the multiply-looped cell of FIG. 7 is that it permits an increase in the magnetic surface area or volume, if desired, and also provides better coupling for the magnetic field developed by the interrogate pulse applied to the conductor 26. Additional turns may be provided in a single cell if desired.

Figure 8:
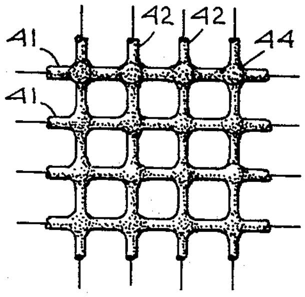
FIG. 8 represents another particular arrangement of storage cells in accordance with the invention which may be employed in the woven screen matrix of FIG. 1.

FIG. 8 depicts another non-destructive readout storage arrangement in accordance with the present invention which comprises a plurality of horizontal conductors 41 and vertical conductors 42, both of which sets of conductors are insulated, interwoven in a conventional mesh pattern. The entire structure is then plated with a layer of remanently magnetic material after flashing of the insulation surface in order to provide a suitable base for the adherence of the magnetic layer. It will be particularly noted that plating the structure in this fashion provides a magnetic layer at each of the respective intersections between the insulated conductors 41 and 42. In this configuration, the storage cells are located at the intersections of the conductors 41 and 42. The structure of the storage cells may be fabricated by flashing the insulation of the conductors, and then depositing a layer of tin thereon. Subsequent heating melts the tin, and surface tension forces cause the tin to form little balls or spheres at the conductor intersections. Finally the layer of remanently magnetic material is deposited to form the storage medium for the individual cells. When thus fabricated, there is no magnetic material between the conductors at the intersections. Binary coded information may be stored in the form of particularly oriented remanent magnetic flux vector planes in selected individual storage cells, in the magnetic layer surrounding vertical conductor 42 and the horizontal conductor 41 of a given intersecting pair, by the application of coincident drive currents to selected conductors 41 and 42. Non-destructive readout may be achieved by the application of interrogate pulses to the selected horizontal conductors 41 at a reduced drive level which serves to operate the magnetic material along a minor hysteresis loop in the reversible or elastic region. This results in a rotation of the flux vector in the layer of remanently magnetic material surrounding the two intersecting conductors 41 and 42 of a selected storage cell, such as 44, and thereby induces a signal on the corresponding vertical conductor 42 having a waveform indicative of the particular binary digit stored in the cell 44. Upon termination of the interrogate pulse, the magnetic flux state returns to the originally established vector corresponding to the stored information, thus permitting the repeated interrogation of a given storage cell without destruction of the stored information state.

Figure 9:
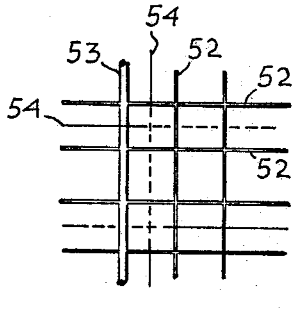
FIG. 9 represents still another particular arrangement of storage cells in accordance with the invention which may be employed in the woven screen matrix depicted in FIG. 1.

FIG. 9 represents still another arrangement for providing non-destructive readout of stored binary information and shows a pair of storage cells together with adjacent buffer cells in a configuration which may be part of a woven screen memory 10 as shown in FIG. 1. The particular arrangement of FIG. 9 achieves the capability of non-destructive readout by providing a substantially higher coercive force for one of the legs of the storage cell than is provided for the remaining legs. The storage cell arrangement of FIG. 9 is shown comprising a plurality of substrate wires 52 and 53 interwoven with a plurality of control conductors 54. Remanently magnetic material is deposited on the substrate wires 52 and 53 to form a closed magnetic loop or path about an intersection of a pair of control conductors 54. The substrate wire 53 is represented as being different from the substrate wires 52 in that it is coated with a higher coercive force remanently magnetic material than that which coats the substrate wires 52. Thus, one leg of each storage cell, namely that which is formed along the substrate wire 53, has a higher coercive force than is present in the remainder of the magnetic loop of the individual storage cell.

This particular variation of coercive force within a given storage cell can be accomplished in a number of different ways. For example, if desired, the substrate wire 53 may be plated with a high coercive force material before being woven in the screen with the remainder of the substrate wires 52 and the control conductors 54. Thereafter, plating of the woven screen in the usual manner to deposit lower coercive force material on all wires except 53 achieves the desired result. Another way of providing a variation in coercive force about an individual storage cell loop is to selectively striate the individual substrate wires 52 and 54 during the drawing thereof, prior to the weaving of the screen. It has been found that striations along a wire tend to develop a different crystal structure in the plating of a magnetic material thereon than that which results when a substrate wire is not striated. The variation in crystal structure which thus results also produces a variation in coercive force of the deposited material. This phenomenon may be utilized to advantage in providing the described storage cell structure having individual legs of different coercive force. It is preferred to arrange the various configurations of different coercive force devices so that the total flux is constant around the magnetic loop of the cell. In this manner the development of poles at the interfaces between the portions of different coercive force is obviated, thus eliminating the resultant demagnetizing forces of the high coercive force leg. However, this is not essential and therefore, if desired, it is possible to utilize a similar configuration in which the total flux is not constant but is permitted to vary in different portions of a given cell.

Storage of information in such a cell is similar to the operation already described with the arrangement of FIG. 2. Half-select drive currents are applied to particular control conductors 54 in a pattern to determine the particular cell and the particular binary digit to be stored therein. A rotational flux pattern results in accordance with the stored binary digit. The stored information may be read out non-destructively by applying an interrogate pulse of reduced amplitude to a selected horizontal conductor 54. The reduced amplitude of the pulse establishes in an individual storage cell a magnetic field which is sufficient to reverse the stored flux condition of the low coercive force portion of the storage cell but is insufficient to reverse the storage state of the high coercive force portion of the cell. The resulting disturbance of the stored flux pattern, however, induces an output signal on the associated vertical control conductor 54, serving also as a sense conductor, of a particular waveform indicative of the stored binary digit. By connection to suitable readout circuitry 16 as shown in FIG. 1, the induced signals on the respective vertical control conductors may be utilized to indicate the stored information states. Upon termination of the interrogate pulse, the magnetomotive force stored in the high coercive force portion of an interrogated storage cell serevs to restore the flux pattern of the low coercive force portion of the cell to that which was originally stored. Thus a given storage cell may be interrogated repeatedly without destroying the stored information.

FIG. 10 depicts another particular configuration of a non-destructive readout storage cell in accordance with the invention which is similar to that shown in FIG. 9 except that three of the legs of the depicted storage cell (along the wires 53) are represented as exhibiting a relatively high coercive force, whereas only one of the legs of the storage cell, namely, the leg corresponding to the wire 52, presents a low coercive force. Operation of this particular type of storage cell is substantially identical to that described in conjunction with FIG. 9. The configuration of FIG. 10 is included herein to show that more than one of the legs of an individual cell may be formed of the high coercive force material, thus achieving a more positive effect in restoring the originally established magnetization state.

It may be noted that care must be exercised in the design of cell structures of the types shown in FIGS. 9 and 10 to ensure that the high coercive force portion of the cell does not demagnetize spontaneously or by successive interrogation. The desired result can be achieved by controlling the length-to-thickness ratio of the high coercive force portion. A detailed consideration of the design parameters relating to this problem may be found, for example, in "Ferromagnetism" by Richard M. Bozorth (Van Nostrand, 1951).

The above-described arrangements in accordance with the present invention represent material improvements with respect to the field of woven screen memory structures. The provision of a non-destructive readout capability in the configuration of a woven screen memory device greatly extends the versatility and utility of such devices. This advantageous improvement in the capability of woven screen memory devices is achieved without adding to the complexity of the woven screen memory structure or to the difficulty of fabrication of such devices.

Although there have thus been described hereinabove a number of particular embodiments of non-destructive readout woven screen memory storage cell arrangements in accordance with the present invention in order to illustrate the manner in which the invention may be used to advantage, it will be appreciated that the invention is not limited thereto. Accordingly, any and all modifications, variations or equivalent arrangements falling within the scope of the annexed claims should be considered to be a part of the invention.

The embodiments of the invention in which an exclusive property or privilege is claimed are defined as follows:

1. A machine woven memory device having the capability of non-destructive readout of stored information comprising:

a plurality of filamentary members interwoven on automatic weaving equipment in a matrix configuration to define a plurality of storage cells;

remanently magnetic material coating said filamentary members at each of said storage cells;

means for selectively establishing magnetic flux states oriented in a predetermined direction in the remanently magnetic material of selected storage cells in accordance with binary coded information to be stored therein;

means for temporarily disturbing the established magnetic flux states in selected storage cells without destroying said flux states; and sensing means for detecting said temporary disturbance of the established flux states as an indication of the binary coded information stored in the corresponding cells.

2. A machine woven memory device in accordance with claim 1 wherein said flux state disturbing means comprises means for temporarily changing the direction of the magnetic flux relative to a preselected filamentary member.

3. A machine woven memory device in accordance with claim 1 wherein said filamentary members comprise a current carrying conductor threading at least a portion of an individual storage cell.

4. A machine woven memory device in accordance with claim 1 wherein each of said storage cells comprises a multiapertured device having a plurality of apertures arranged on opposite sides of a central leg portion, and said filamentary members comprise an interrogate conductor for carrying current along said central leg.

5. A machine woven memory matrix comprising:
- a first plurality of filamentary members arranged orthogonally to form a plurality of meshes;
- a second plurality of filamentary members successively looped about the respective intersections of said first plurality of filamentary members;
- remanently magnetic material coating said second plurality of filamentary members on at least the loop portions thereof; and
- means for applying an interrogate signal to selected ones of said second plurality of filamentary members in order to determine the remanent magnetization state of selected cells of the matrix without destroying said state.

6. A memory device in accordance with claim 5 wherein the looped members are insulated conductors.

7. A memory structure in accordance with claim 5 wherein the information storage cells comprise a looped member being looped a plurality of times about the orthogonal members threading the cell.

8. A machine woven memory matrix comprising:
- a plurality of conductors interwoven orthogonally to establish a plurality of conductor intersections;
- remanently magnetic material deposited to encompass the conductors at respective intersections;
- means for selectively establishing remanent magnetization states at individual conductor intersections; and
- means for applying interrogate signals to selected ones of said conductors to determine the remanent magnetization state at corresponding individual intersections without reversing said states.

9. A woven screen memory device having the capability of non-destructive readout of stored information comprising:
- first and second pluralities of filamentary members interwoven n a matrix configuration to define a plurality of storage cells;
- remanently magnetic material coating said filamentary members at each of said storage cells;
- means for selectively establishing magnetic flux states oriented about a first axis in said remanently magnetic material at selected storage cells;
- means for temporarily disturbing the established magnetic flux states about said first axis in selected storage cells without destroying said flux states; and
- sensing means for detecting said temporary disturbance of the established flux states.

10. A woven screen memory device having the capability of non-destructive readout of stored information comprising:
- first and second pluralities of filamentary members interwoven in a matrix configuration to define a plurality of storage cells;
- remanently magnetic material coating said filamentary members at each of said storage cells,
- at least some of said first plurality of filamentary members comprising conducting wires adapted to carry current for selectively establishing magnetic flux states oriented about a first axis in the remanently magnetic material at selected storage cells,
- at least some of said second plurality of filamentary members comprising conducting wires adapted to carry current for temporarily disturbing without destroying the magnetic flux states about said first axis in selected storage cells; and
- sensing means for detecting said temporary disturbance of the established flux states.

11. A woven screen memory device having the capability of non-destructive readout of stored information comprising:
- first and second sets of wires interwoven in a screen configuration to define a plurality of storage cells;
- remanently magnetic material coating the wires of said first set to provide closed magnetic loops and encircling corresponding intersections of the second set of wires at the respective storage cells;
- means for selectively applying current to wires of said second set to establish magnetic flux states oriented along a first axis in the remanently magnetic material at selected storage cells,
- at least some of the wires of the first set being insulated and adapted to carry current along paths which are electrically isolated from the other wires and from the magnetic coating thereon;
- means for selectively applying current to the insulated wires of the first set to introduce a time varying magnetic flux oriented along a second axis in selected storage cells without destroying the previously established flux states; and
- sensing means for detecting the time variation of flux in the respective storage cells in order to determine the stored information non-destructively.

12. A woven screen memory device having the capability of non-destructive readout of stored information comprising:
- first and second pluralities of filamentary members interwoven in a screen configuration to define a plurality of storage cells;
- remanently magnetic material coating at least some of the filamentary members at each of said storage cells;
- means for selectively establishing magnetic flux states oriented about a first axis in the remanently magnetic material at selected storage cells;
- means for temporarily disturbing said established magnetic flux states in at least a portion of the remanently magnetic material in selected storage cells without reversing the net effective flux corresponding to the stored states; and
- sensing means for detecting said temporary disturbance of the magnetic flux in the selected storage cells.

13. A woven screen memory device having the capability of non-destructive readout of stored information comprising:
- a plurality of filamentary members interwoven in a matrix configuration to define a plurality of storage cells, each of said storage cells consisting of a pair of filamentary members in the form of insulated conductors intersecting at substantially right angles and having remanently magnetic material deposited on the conductors at the intersection and extending between the intersecting conductors;
- means for selectively applying current to a first group of conductors to establish predetermined flux states at selected storage cells; and
- means for selectively applying currents to a second group of conductors to temporarily disturb the flux states established by current in the first group of conductors without destroying said established flux states in selected storage cells.

14. A woven screen memory device having the capability of non-destructive readout of stored information comprising:
- a plurality of substrate wires and a plurality of control conductors interwoven in a matrix configuration to define a plurality of storage cells;
- remanently magnetic material coating the plurality of wires to establish closed magnetic loops about intersections of the plurality of control conductors at each of the storage cells, the remanently magnetic material exhibiting a different coercive force at different portions of the closed magnetic loop of each storage cell;

means for selectively applying currents to the control conductors to establish magnetic flux states at selected storage cells in accordance with information to be stored;

means for selectively applying currents to the control conductors of a magnitude sufficient to change the flux along a low coercive force portion of a magnetic loop in selected storage cells without reversing the flux state of the high coercive force portion of the magnetic loop; and sensing means for detecting the change of flux in order to read out the stored information non-destructively.

References Cited

UNITED STATES PATENTS

| | | | |
|---|---|---|---|
| 3,427,602 | 2/1969 | Shevel | 340—174 |
| 2,988,733 | 6/1961 | Mallery | 340—174 |
| 3,229,265 | 1/1966 | Brownlow et al. | 340—174 |
| 3,309,681 | 3/1967 | Boles et al. | 340—174 |
| 3,354,445 | 11/1967 | Prohofsky et al. | 340—174 |
| 3,366,938 | 1/1968 | Matsushita | 340—174 |

BERNARD KONICK, Primary Examiner

K. E. KROSIN, Assistant Examiner